US012303911B2

(12) United States Patent
Neff et al.

(10) Patent No.: US 12,303,911 B2
(45) Date of Patent: May 20, 2025

(54) ROLLER WITH A SENSOR

(71) Applicant: Bühler AG, Uzwil (CH)

(72) Inventors: Martin Neff, Rossrüti (CH); Marcos Luquin, Constance (DE)

(73) Assignee: Bühler AG, Uzwil (CH)

( * ) Notice: Subject to any disclaimer, the term of this patent is extended or adjusted under 35 U.S.C. 154(b) by 329 days.

(21) Appl. No.: 17/753,105

(22) PCT Filed: Aug. 7, 2020

(86) PCT No.: PCT/EP2020/072253
§ 371 (c)(1),
(2) Date: Feb. 18, 2022

(87) PCT Pub. No.: WO2021/037525
PCT Pub. Date: Mar. 4, 2021

(65) Prior Publication Data

US 2022/0288599 A1 Sep. 15, 2022

(30) Foreign Application Priority Data

Aug. 23, 2019 (EP) .................................... 19193455

(51) Int. Cl.
*B02C 4/42* (2006.01)
*B02C 4/06* (2006.01)
*B02C 4/28* (2006.01)
(Continued)

(52) U.S. Cl.
CPC .................. *B02C 4/42* (2013.01); *B02C 4/06* (2013.01); *B02C 25/00* (2013.01)

(58) Field of Classification Search
CPC .. B02C 25/00; B02C 4/06; B02C 4/30; B02C 4/38; B02C 4/44; B02C 2210/01; B02C 4/42; G06N 20/00; H02J 50/10
See application file for complete search history.

(56) References Cited

U.S. PATENT DOCUMENTS 7,825,655 B1 11/2010 Stabel et al.
2008/0211356 A1* 9/2008 Kataoka ............ H02K 11/0141 310/68 B
(Continued)

FOREIGN PATENT DOCUMENTS

CN 105126959 A 12/2015
CN 105492859 A 4/2016
(Continued)

OTHER PUBLICATIONS

English translate (WO2018036978A1), retrieved date Jan. 26, 2024.*
Fasten Definition & Meaning—Merriam-Webster, retrieved date Sep. 2, 2024.*

*Primary Examiner* — Mohammed S. Alawadi
(74) *Attorney, Agent, or Firm* — Colson Law Group, PLLC

(57) ABSTRACT

The present invention relates to a grinder roller for use in a grinder roller pair, in particular a grain roller pair, comprising at least one sensor for the detection of measured values which characterize a state of the grinder roller, wherein the sensor is arranged in a receiving opening of the grinder roller, at least one data transmitter for the contactless transmission of the measured values of the at least one sensor to a data receiver, wherein the sensor is enclosed in the receiving opening by means of a cap made from ceramic material. Furthermore, the present invention relates to a corresponding grinder roller pair, to a production plant which comprises a grinder roller pair of this type, to a corresponding cap, to a kit consisting of a corresponding cap and a fastening device, and to a method for operating a product processing plant of this type.

15 Claims, 2 Drawing Sheets

Figure 1:
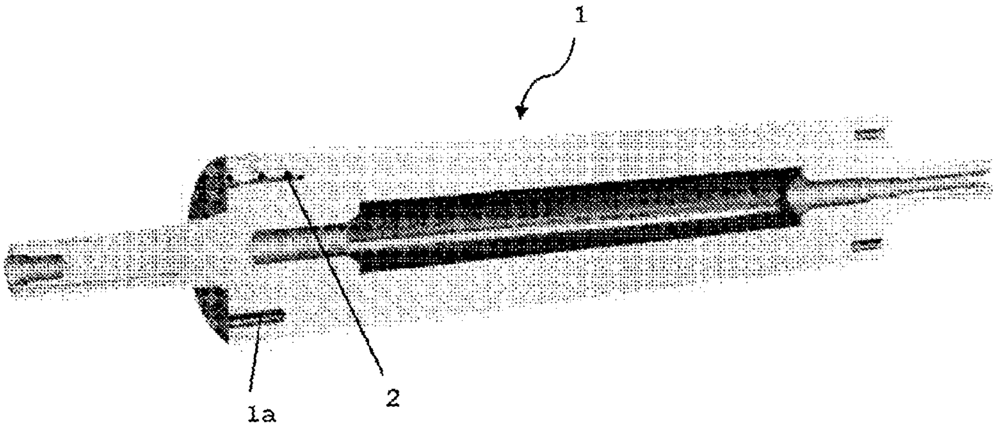

(51) Int. Cl.

| | |
|---|---|
| ***B02C 4/30*** | (2006.01) |
| ***B02C 4/38*** | (2006.01) |
| ***B02C 25/00*** | (2006.01) |

(56) References Cited

U.S. PATENT DOCUMENTS

| | | | | |
|---|---|---|---|---|
| 2013/0021029 | A1* | 1/2013 | Hoenicka | H03K 17/9505 324/258 |
| 2015/0048463 | A1* | 2/2015 | Chiang | B81C 1/0023 257/417 |
| 2016/0107162 | A1* | 4/2016 | Busenhart | B02C 4/32 241/25 |
| 2019/0240672 | A1 | 8/2019 | Reiter | |
| 2019/0343300 | A1* | 11/2019 | Junkell | G01F 23/263 |

FOREIGN PATENT DOCUMENTS

| | | | | |
|---|---|---|---|---|
| CN | 109317246 | A | 2/2019 | |
| CN | 109890507 | A | 6/2019 | |
| DE | 19819614 | A1 | 11/1999 | |
| DE | 10226411 | A1 | 12/2003 | |
| DE | 102017222820 | A1 | 6/2019 | |
| JP | H05177222 | A | 7/1993 | |
| JP | 2002001405 | A | 1/2002 | |
| RU | 2010604 | C1 | 4/1994 | |
| RU | 2464097 | C1 | 10/2012 | |
| WO | 2007/025395 | A1 | 3/2007 | |
| WO | 2007/101319 | A1 | 9/2007 | |
| WO | 2014/195309 | A1 | 12/2014 | |
| WO | WO-2018036978 | A1 * | 3/2018 | B02C 25/00 |

* cited by examiner

ROLLER WITH A SENSOR

The present invention relates to a sensor for a roller of a roller pair—in particular, a grinder roller pair such as a grain roller pair—wherein the sensor is integrated into the roller and has an improved cover cap.

Grinder rollers, as they are used, for example, in the grain-milling industry, require continuous monitoring. For example, it may happen that so-called dry-running occurs in which adjacent grinder rollers contact one another, and the drive power of the motor is converted in an uncontrolled manner into heat. If this state lasts for too long, the temperature of the grinder roller can rise into a critical range and possibly cause a fire.

A common precautionary measure in the prior art consists in monitoring the temperature of a grinder roller with the aid of one or more sensors and outputting a warning message when an ignitable temperature is reached. Optical systems for detecting the circumferential surface of the grinder roller are frequently used for this purpose. However, this is problematic in that these optical systems are located outside the grinder rollers in the product chamber through which the grinding stock also flows. For this reason, such optical systems are extremely susceptible to contamination.

It is known from DE 102 26 411 A1 to measure the temperature of the circumferential surface of a grinder roller contactlessly with the aid of temperature sensors. Due to the distance between the sensor and the circumferential surface of the grinder roller, the actual temperature of the circumferential surface can in part differ considerably from the measured temperature. These deviations must then, on the basis of pure empirical values, be taken into account in the evaluation, which is complicated and also prone to errors.

DE 198 19 614 A1 also discloses temperature probes which are arranged at a distance from the grinder rollers.

Furthermore, pressure sensors or sensors for measuring the surface quality of a grinder roller are also known, with the aid of which the contact pressure between two, adjacent grinder rollers or the wear of a grinder roller can be measured. Furthermore, vibration sensors for grinder rollers are known from WO 2007/025395 A1, for example.

All these sensors are likewise arranged outside the grinder rollers.

In order to eliminate the disadvantages associated with an arrangement of sensors outside the grinder rollers, WO 2014/195 309 A1 proposed to integrate the sensor(s) into a grinder roller.

It was the aim of the present invention to overcome the above-described disadvantages of the prior art.

The above aim is achieved according to the invention by the subject matter of the independent claims.

In detail, the present invention relates to a grinder roller for use in a grinder roller pair—in particular, a grain roller pair—comprising

- at least one sensor for the detection of measured values which characterize a state of the grinder roller, wherein the sensor is arranged in a receiving opening of the grinder roller,
- at least one data transmitter for the contactless transmission of the measured values of the at least one sensor to a data receiver, characterized in that the sensor is enclosed in the receiving opening by means of a cap made of ceramic material.

The present invention furthermore relates to a grinder roller pair—in particular, a grain roller pair—comprising at least one grinder roller according to the invention.

The present invention furthermore relates to a product processing plant—in particular, a grain mill—containing at least one grinder roller pair according to the invention. Alternatively, it can also be a roller press in the milling industry, a flaking mill, e.g., for oil production from oilseeds or for grain flaking, or a cracking mill, e.g., in the oilseed oil industry or feed industry, the rollers of which are also to be understood as “grinder rollers” or “grinder roller pairs” in the sense of the present invention.

The present invention furthermore relates to a method for operating a product processing plant according to the invention, comprising the step of detecting the state of a grinder roller according to the invention by means of the sensor arranged in the grinder roller.

The present invention furthermore relates to a sensor cap made of ceramic material, which cap is configured or adapted for use as a cap for enclosing a sensor in a receiving opening of a grinder roller, and also to a kit consisting of a sensor cap described here and a fastening device, wherein this fastening device preferably consists of a ring made of a metallic material.

In the sense of the present invention, “processing of a product” is understood to mean the grinding, comminution, and/or flaking of bulk material—in particular, grains, grain-milling products, and grain end products of the milling industry or special milling industry as stated above—wherefore the pairs of grinder rollers or flaking rollers described in more detail below can, for example, be used as roller pairs.

Grinder rollers in the sense of the present invention are designed to grind granular grinding stock, which is usually conducted between a grinder roller pair of two grinder rollers. Grinder rollers—in particular, the grinder rollers of the grinder roller pairs according to the invention—usually have an essentially inelastic surface (in particular, on their circumferential surface), which for this purpose can, for example, contain or consist of metal, such as steel—in particular, stainless steel. A relatively firm and, frequently, hydraulically-regulated mill gap usually exists between the grinder rollers of the grinder roller pair. In many grinding plants, the grinding stock is conducted substantially vertically downwards through such a mill gap. Moreover, the grinding stock in many grinding plants is fed by means of its gravity to the grinder rollers of a grinder roller pair, wherein this feeding can, optionally, be pneumatically supported. The grinding stock is usually granular and moves as a fluid flow through the mill gap. As a result of these properties, a grinder roller (in particular, a grinder roller of a grinder roller pair according to the invention) and a grinding plant containing at least one such grinder roller differ, for example, from many rollers, which are usually used for the transport of paper.

According to the present invention, the grinding stock is usually understood to mean a product in powder, granule, or pellet form used in the processing of grains, grain-milling products, and grain end products in the milling industry (in particular, grinding of soft wheat, durum, rye, maize, and/or barley) or special milling industry (in particular, dehulling and/or grinding of soy, buckwheat, barley, spelt, millet/sorghum, pseudocereals, and/or legumes), the production of feed for farm and domestic animals, fish, and crustaceans, the processing of oilseeds, the processing of biomass and production of energy pellets, industrial malthouses and cracking plants; the processing of cocoa beans, nuts, and coffee beans, the production of fertilizers, in the pharmaceutical industry, or in the chemistry of solids.

At least one roller—in particular, both rollers—of the grinder roller pair—in particular, at least one grinder roller and, in particular, both grinder rollers of the grinder roller pair, can, for example, be designed as a smooth roller or as a corrugated roller or as a roller base body with screwed-on plates. Smooth rollers can be cylindrical or cambered. Corrugated rollers can have various corrugating geometries, such as roof-shaped or trapezoidal corrugating geometries, and/or have segments attached to the circumferential surface.

At least one roller—in particular, both rollers—of the grinder roller pair—in particular, at least one grinder roller and, in particular, both grinder rollers of the grinder roller pair, can have a length in the range of 100 mm to 2,500 mm and a diameter in the range of 200 mm to 800 mm.

The circumferential surface of the roller—in particular, of the grinder roller—is preferably non-detachably connected to the roller body and, in particular, formed in one piece therewith. This allows simple production and reliable and robust processing—in particular, grinding—of the product.

The at least one sensor is designed to detect measured values that characterize a state of at least one of the rollers—in particular, of both rollers—of the roller pair. In particular, it can be a state of a circumferential surface of at least one of the rollers—in particular, of both rollers—of the roller pair. The state can, for example, be a temperature, a pressure, a force (force component(s) in one or more directions), a wear, a vibration, a deformation (expansion and/or deflection path), a rotational speed, a rotational acceleration, an ambient humidity, a position, or an orientation of at least one of the rollers—in particular, of both rollers—of the roller pair.

At least one roller of the roller pair—in particular, at least one grinder roller of the grinder roller pair—contains at least one sensor. When the roller rotates during operation, the sensor also rotates. In particular, the at least one sensor is arranged within a bottom surface of the roller. The at least one sensor is therefore not located in the product chamber through which the product—in particular, the grinding stock—flows. A product processing plant with at least one such roller—in particular, a grinding plant with at least one such grinder roller—is thus significantly less susceptible to contamination. Moreover, the measurement can take place directly in the roller, which makes the measurement significantly more precise.

The sensor can be designed, for example, as a MEMS sensor (MEMS: Micro-Electro-Mechanical System).

The sensor is preferably in data connection with at least one data transmitter, wherein the data transmitter is designed for the contactless transmission of the measured values of the at least one sensor to a data receiver. According to the invention, the data transmitter is preferably arranged on or in the same roller as the sensor in data connection therewith. Particularly preferably, the data transmitter includes an antenna.

With the aid of the at least one data transmitter, the measured values can be transmitted contactlessly to a data receiver, which is not part of the roller. In particular, it can be a stationary data receiver in relation to which the at least one sensor is moved when the roller rotates. The contactless transmission makes it possible to avoid complex rotary feedthroughs for cables, which would otherwise be necessary.

Advantageously, at least one roller—in particular, both rollers—contains several of the sensors described above—in particular, at least two, preferably at least four, and more preferably at least six sensors, which are contained in the roller. More preferably, several sensors are in data connection with the at least one data transmitter. The sensors can be arranged at various positions along an axis of rotation of the roller and/or at various angles around this axis of rotation. The more sensors the roller contains and the more uniformly these sensors are distributed, the more meaningful are the measured values detected by them. The sensors are preferably arranged uniformly in the circumferential direction, resulting in a rotational equilibrium.

At least one sensor can be designed as a

- temperature sensor, wherein, preferably, several temperature sensors are present which are arranged along an axis of rotation of the roller in order to be able to determine a temperature profile along this direction;
- pressure sensor;
- force sensor (for determining the force component(s) in one or more directions);
- wear sensor;
- vibration sensor—in particular, for determining a winding, i.e., an adhesion of the processed product to the circumferential surface of the roller, which impedes processing—in particular, grinding—at this position;
- deformation sensor (for determining an expansion and/or a deflection path);
- rotational speed sensor—in particular, for determining a standstill of the roller;
- rotational acceleration sensor;
- sensor for determining an ambient humidity, the sensor preferably being arranged on a front face of the roller;
- gyroscopic sensor for determining the position and/or orientation of the roller—in particular, for determining the position—and/or orientation-dependent width of a gap between the two rollers of the roller pair and the parallelism of the rollers;
- sensor for determining the width of a gap between the two rollers of the roller pair—in particular, a mill gap between the two grinder rollers of the grinder roller pair—e.g., a sensor—in particular, a MEMS sensor—arranged in a front face of the roller.

According to the invention, any combinations of the sensors described above are possible. For example, the roller can contain several temperature sensors and deformation sensors. According to a further embodiment, all sensors present can be of the same type, i.e., can be designed as temperature sensors, for example. According to a further embodiment, at least one roller—in particular, both rollers—can contain sensors of various types.

If one roller contains or both rollers contain several sensors as well as at least one data transmitter, it is preferred if the at least one data transmitter is designed for the contactless transmission of the measured values from several of the sensors—more preferably from all sensors—to a data receiver. Preferably, at least one roller—in particular, each of the two rollers—contains at most only one single—particularly preferably, precisely one single—data transmitter for the contactless transmission of the measured values. The fewer data transmitters the roller contains, the simpler the structure of this roller is.

In particular, if at least one roller contains only one single data transmitter, this roller—in particular, both rollers—preferably contains at least one multiplexer, which is arranged and designed for the alternating transmission of the measured values detected by the sensors to the data transmitter.

The contactless transmission can take place, for example, by infrared radiation, by light pulses, by radio frequency signals, by inductive coupling, or by a combination thereof.

The contactless transmission of the measured values here and in the following always also comprises the transmission of data which are obtained by corresponding processing of the measured values and which are thus based upon the measured values. For example, at least one roller—in particular, both rollers—can contain at least one signal converter—in particular, at least one A/D converter—for converting the measured values detected by the at least one sensor. In a first possible variant, each sensor can be assigned at least one signal converter, which converts the measured values detected by this sensor. Subsequently, the converted signals can be fed to a multiplexer as already described above. If the signal converters are A/D converters, the multiplexer can be a digital multiplexer. In a second possible variant, the signal converter can also be arranged between a multiplexer as described above and the data transmitter. In this case, the multiplexer can be an analog multiplexer.

At least one roller—in particular, both rollers—preferably contains in particular a roller body described further below of at least one roller—in particular, of both rollers—at least one energy receiver, and/or at least one energy generator. An energy supply of the at least one sensor and/or of at least one multiplexer (in particular, of at least one multiplexer as described above) and/or of at least one signal converter (in particular, at least one signal converter as described above) and/or of the at least one data transmitter (in particular, of the data transmitter contained on or in the roller) and/or of at least one data transmitter of a measuring device described further below can thus be achieved.

In particular, it can contain a battery—in particular, a rechargeable battery—by means of which the aforementioned energy supply can be achieved. Conventional and rechargeable batteries (accumulators) are known.

Alternatively, it can be an inductive energy receiver. In this variant, the energy receiver can have, for example, at least one receiving coil with the aid of which electromagnetic energy can be inductively coupled in. Alternatively or additionally, however, the energy receiver can also be designed to receive light energy. In a further variant, the energy generator can be designed for energy recovery from the movement of the roller (in particular, using thermoelectric effects, such as the Seebeck effect, Peltier effect, or Thomson effect, e.g., with the aid of a thermocouple; or using vibrations or movements of the roller, such as with the aid of at least one piezoelement).

Advantageously, at least one roller—in particular, both rollers—contains at least one printed circuit board (in particular, a MEMS printed circuit board) on which the at least one sensor and/or at least one multiplexer (in particular, at least one multiplexer as described above) and/or at least one signal converter (in particular, at least one signal converter as described above) and/or the at least one data transmitter (in particular, the data transmitter contained on or in the roller) and/or at least one energy receiver (in particular, at least one energy receiver as described above) and/or at least one energy generator (in particular, at least one energy generator as described above) are arranged. The printed circuit board can contain measurement lines via which the sensors are connected to the multiplexer. Such a printed circuit board has the advantage that the aforementioned components can be arranged in a very compact manner thereon, and that the printed circuit board can be manufactured as a separate assembly and can be replaced again if necessary, at least in some exemplary embodiments.

Alternatively to a printed circuit board, however, the sensors can also be connected to the data transmitter and/or the multiplexer via a cable harness.

According to the invention, at least one roller—in particular, both rollers—comprises a roller body with at least one receiving opening, into which the sensor is, in particular, detachably insertable or inserted.

In another embodiment, however, it may also be expedient if the sensor is inserted non-detachably in the receiving opening. In this way, the sensor can be connected more securely to the roller body. Moreover, unauthorized removal of the sensor, which could impair safety, can be prevented. The sensor may, for example, be cast (for example, by means of a resin) or welded in the receiving opening. As a result, the risk of explosions can also be avoided, such that, in particular, the ATEX guidelines of the European Union can be fulfilled.

According to the invention, the receiving opening is preferably formed by a cylindrical bore which has a diameter in the range of 5 mm to 40 mm—preferably of 5 mm to 25 mm, and particularly preferably of 10 mm to 20 mm—wherein, in the opening region of the bore, a range of 10 to 50 mm—preferably 20 to 40 mm—is preferably provided, with a somewhat larger diameter and, particularly preferably, a thread for the fixed accommodation of the cap made of ceramic material and described below.

This bore preferably extends in parallel to an axis of rotation of the roller body. In order to be able to determine the state of a circumferential surface, the receiving opening is preferably arranged in an outer region of the roller body. The receiving opening can thus be located, for example, in a circular-cylindrical region of the roller body.

According to the invention, the receiving opening preferably extends substantially along the length of the roller body in parallel to the axis of rotation, e.g., along at least 10%—preferably at least 20%, and particularly preferably between 50% and 100%—of the entire length of the roller body, wherein 100% corresponds to a throughbore. The at least one receiving opening is preferably arranged such that a mass balance is taken into account, since balancing the roller can be dispensed with as a result. Alternatively, two or more receiving openings may also be provided, which are preferably arranged uniformly in the circumferential direction; balancing can also be dispensed with as a result. Alternatively or additionally, two substantially coaxial receiving openings with less than 50% of the entire length of the roller body can be present with one sensor each. Alternatively or additionally, two non-coaxial receiving openings, each with more than 50% of the entire length of the roller body, can be present with one sensor each—preferably on opposite front faces of the grinder roller—whereby the temperature profile in the case of rollers which are longer than the sensors can also be measured with two sensors.

The sensor is preferably rod-shaped. It is also possible according to the invention to arrange several sensors in the form of a single, rod-shaped measuring device which can be introduced into the receiving opening.

The present invention solves the problem of the prior art of arranging the sensor securely in the receiving opening of the roller and reliably protecting it from conceivable extreme operating conditions, and, moreover, of ensuring reliable transmission of the radio signals of the sensor to a data receiver arranged outside the roller.

This is achieved according to the invention by enclosing the sensor in the receiving opening by means of a cap made of ceramic material.

In comparison with, for example, plastic caps, the cap according to the invention made of ceramic material has better temperature resistance and, moreover, enables improved transmission of the radio signals of the sensor to a data receiver arranged outside the roller.

According to the invention, any ceramic material that is food-safe (according to the EN10/2011, 84/500/EEC provisions), impact-resistant (no material splintering under the operating conditions of the roller), and temperature-resistant (at least up to temperature of 400° C.) can be used as the ceramic material. Moreover, the ceramic material to be used according to the invention should be permeable to electromagnetic waves in the relevant range of the radio signal transmission (in particular, at about 2.4 GHz). According to the invention, the ceramic material has a high relative permittivity—preferably in the range of 5 to 50, and particularly preferably in the range of 25 to 30.

According to the invention, zirconium oxide ($ZrO_2$), aluminum oxide ($Al_2O_3$), or silicon nitride ($Si_3N_4$) can be used as ceramic material. According to the invention, the ceramic material is particularly preferably zirconium oxide ($ZrO_2$).

According to the invention, the cap made of ceramic material preferably has an external thread, an internal thread, or both an external thread and an internal thread. With the aid of the internal thread, secure fastening of the cap to the sensor or the measuring device can be achieved. With the aid of the external thread, secure fastening of the cap in the receiving opening (if the latter has a corresponding mating thread in the opening region) can be achieved.

The cap according to the invention made of ceramic material is preferably cylindrical and has, at least in one section, an interior chamber for receiving the sensor or the data transmitter.

Toward one end, the cap material according to the invention made of ceramic is closed, so that the cap, when it is arranged in the receiving opening of the roller, closes off this receiving opening from the surroundings. This end preferably has parts for arranging a tool for mounting or removing the cap with the sensor or the measuring device. These parts can, for example, be recesses in which corresponding components of the tool can be fixedly arranged.

According to the invention, the cap made of ceramic material preferably has a length in the range of 10 to 50 mm—preferably 15 to 40 mm, and particularly preferably 20 to 30 mm. According to the invention, the cap made of ceramic material preferably has an outer diameter in the range of 10 to 50 mm—preferably 15 to 40 mm, and particularly preferably 20 to 30 mm. According to the invention, the cap made of ceramic material more preferably has an interior chamber for receiving the sensor or the data transmitter, which has a length in the range of 5 to 20 mm—preferably 10 to 15 mm—and a diameter in the range of 10 to 30 mm—preferably 15 to 25 mm—wherein the diameter can vary over the length of the interior chamber within the specified range.

According to a preferred embodiment of the present invention, the cap made of ceramic material is, by means of a fastening device, additionally fixed at the outer end of the receiving opening of the roller. Preferably, this fastening device is a ring made of a metallic material—for example, steel. The fastening device has a geometry which ensures a fixation of the fastening device on the cap made of ceramic material and a fixation in the receiving opening of the roller. For example, the fastening device can be a ring with an outer diameter in the range of 20 to 30 mm and an inner diameter in the range of 10 to 20 mm, wherein the width of the ring should lie in the range of 3 to 10 mm.

According to a further preferred embodiment of the present invention, the sensor or the data transmitter is surrounded at least in one section by a material with high electrical conductivity (greater than $10^6$ S/m)—preferably a metal, e.g., aluminum or copper—for improving the transmission and reception of a radio signal. Preferably, this material is provided in the form of a foil or a ring which surrounds the sensor or the data transmitter preferably in the head region (i.e., the region which is introduced into the interior chamber of the cap made of ceramic material).

The present invention furthermore relates to a product processing plant—in particular, a grain mill—containing at least one grinder roller pair with a roller according to the invention.

The product processing plant for processing a product—in particular, a grinding plant for the grinding of grinding stock—contains at least one roller pair described above—in particular, a grinder roller pair. A gap is formed between the rollers of the roller pair. In particular, a mill gap is formed between the grinder rollers of a grinder roller pair. Within the scope of the invention, only one of the two rollers of the roller pair has to be designed according to the invention; however, the invention also covers embodiments in which both rollers of the roller pair are designed according to the invention, i.e., contain at least one sensor as described above. Particularly when grinding grinding stock, this grinding stock is conducted substantially vertically downwards through such a mill gap. Moreover—particularly when grinding grinding stock—this grinding stock is preferably fed by means of its gravity to the grinder rollers, wherein this can, optionally, be supported pneumatically. The product—in particular, the bulk material, and in particular the grinding stock—can be granular and move as a fluid flow through the mill gap.

In addition, the product processing plant can have at least one data receiver—in particular, a stationary data receiver—for receiving the measured values transmitted by the data transmitter of at least one of the rollers—in particular, of both rollers—of the roller pair. The advantages already described above can be achieved with such a product processing plant. Particularly when the grinding plant contains several different roller pairs to which the product is fed from the same product inlet, it can be advantageous if only one of the roller pairs is designed according to the invention.

The grinding plant may, for example, be a single roller mill of a grain mill or even an entire grain mill with at least one roller mill, wherein at least one roller mill contains at least one grinder roller described above. Alternatively, it can be a roller press in the milling industry, a flaking mill for oil production from oilseeds, or a cracking mill in the oil industry or feed industry.

The present invention furthermore relates to a method for operating a product processing plant of this type, comprising the step of detecting the state of a grinder roller according to the invention by means of the sensor arranged in the grinder roller.

The method comprises a step in which measured values transmitted by a data transmitter of at least one of the rollers—in particular, of both rollers—of the roller pair are received by the data receiver of the product processing plant.

The data thus received can subsequently be processed further and evaluated. For this purpose, they can be fed to a control unit of the product processing plant—in particular, the grinding plant—whence they can be forwarded to an optional superordinate control system. With the aid of the control unit and/or the control system, the entire product processing plant—in particular, the entire grinding plant—or a part thereof can be controlled and/or regulated.

In particular, the control unit can output a warning message if a predetermined warning criterion is met. The warning criterion can, for example, consist in the measured value of at least one of the sensors exceeding a limit value predetermined for this sensor. In another variant, the warning criterion can consist in the difference between the largest measured value and the smallest measured value, which are measured by a predetermined quantity of sensors, exceeding a predetermined limit value. If the warning criterion is met, a warning signal can be output (for example, optically and/or acoustically), and/or the product processing plant can be brought to a standstill (for example, by the control unit). The control unit can also visually display the measured values detected by the at least one sensor or data obtained therefrom.

According to the invention, the step of detecting the state of the grinder roller is particularly preferably carried out continuously during the operation of the product processing plant, so that any problem can be detected and eliminated in a timely manner.

Figure 2:
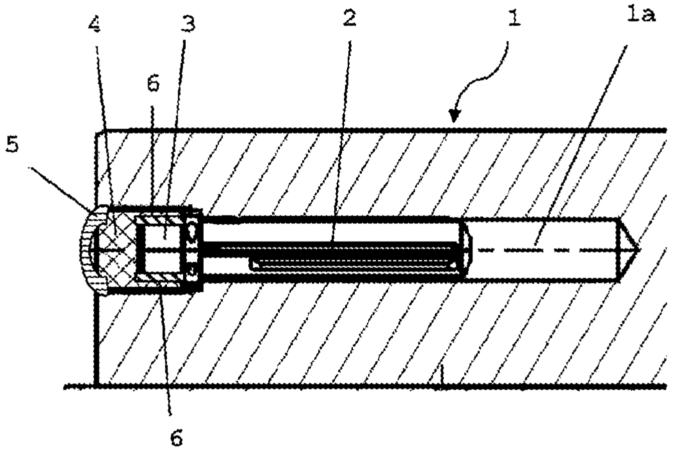
Figure 3:
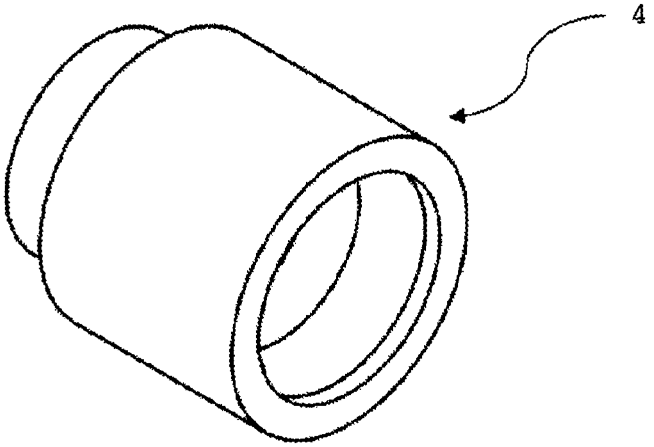
Figure 4:
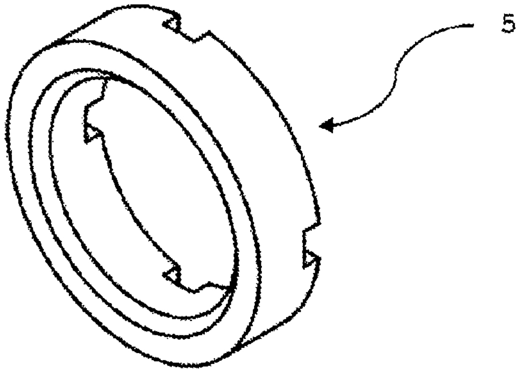

The present invention is explained in more detail below with reference to non-limiting, exemplary embodiments and drawings. The following are shown:

FIG. 1 a schematic view of a grinder roller according to the invention with a sensor arranged therein;

FIG. 2 a schematic view of a receiving opening of a grinder roller according to the invention with a sensor arranged therein;

FIG. 3 a schematic view of a cap according to the invention made of ceramic material;

FIG. 4 a schematic view of a fastening device according to the invention.

FIG. 1 shows a schematic view of a grinder roller 1 according to the invention with a sensor 2 arranged therein. Grinder rollers 1 of this type are well known. The grinder roller 1 according to this embodiment has four receiving openings 1*a* (shown in more detail in FIG. 2), into which a sensor 2 or a measuring device with several sensors can be arranged. The receiving openings 1*a* are located and arranged symmetrically (to avoid imbalances) in the circumferential region of the roller, i.e., close to the lateral surface of the roller, in order to determine the physical values corresponding to the roller surface.

FIG. 2 shows a schematic view of a receiving opening 1*a* of a grinder roller 1 according to the invention with a sensor 2 arranged therein. The sensor 2 is located completely in the receiving opening 1*a*. A cap 4 made of ceramic material—preferably zirconium oxide—is fixed on the head 3 of the sensor 2. The cap 4 made of ceramic material closes off the receiving opening 1*a* from the surroundings, and thus protects the sensor 2 or prevents any product contamination due to damage to the sensor 2.

The cap 4 made of ceramic material is fixed at the outer end of the receiving opening 1*a* with the aid of a fastening device 5—preferably a steel ring.

In order to improve the transmission and reception of a radio signal, the sensor 2 according to this embodiment is surrounded in the region of its head 3 by a material 6 with high electrical conductivity—preferably a metal. According to the embodiment shown here, the material 6 with high electrical conductivity surrounds the head 3 of the sensor 2 in the form of a foil or a ring.

FIG. 3 shows a schematic view of a cap 4 according to the invention made of ceramic material. The cap 4 has an interior chamber (in the form of a blind bore) for receiving the sensor 2 and is designed at its closed end in such a way that a fastening device, such as the ring 5 shown in FIG. 4, can be fixed thereon.

FIG. 4 shows a schematic view of a fastening device 5 according to the invention—here, in the form of a metal ring. The fastening device 5 is designed in such a way that it can be fixed on a cap 4 made of ceramic material, such as the cap 4 shown in FIG. 3.

What is claimed is:

1. A grinder roller for use in a grinder roller pair comprising:

at least one sensor for detecting measured values which characterize a state of the grinder roller, wherein the at least one sensor is arranged in a receiving opening of the grinder roller; and at least one data transmitter for contactless transmission of the measured values of the at least one sensor to a data receiver, wherein the at least one sensor is enclosed in the receiving opening by means of a cap made of ceramic material, the cap having an external thread and an internal thread, wherein the cap is fixed at the outer end of the receiving opening by way of a conductive ring made of a metallic material.

2. The grinder roller according to claim 1, wherein the cap made of ceramic material is manufactured from zirconium oxide ($ZrO_2$).

3. The grinder roller according to claim 1, wherein the at least one sensor is surrounded at least in one section by a metal with high electrical conductivity for improving a transmission and reception of a radio signal.

4. The grinder roller according to claim 3, wherein the at least one sensor is surrounded in a region of its head by the material with high electrical conductivity.

5. The grinder roller according to claim 3, wherein the material with high electrical conductivity surrounds the at least one sensor in a form of a foil or a ring.

6. The grinder roller according to claim 1, wherein the at least one sensor has at least one battery for supplying energy to the sensor.

7. The grinder roller according to claim 1, wherein the at least one sensor has at least one electronic component for data transmission, signal conversion, or both.

8. The grinder roller pair comprising at least one the grinder roller according to claim 1.

9. A product processing plant containing at least one the grinder roller pair according to claim 8.

10. A method for operating a product processing plant containing at least one the grinder roller pair according to claim 8, comprising the step of detecting the state of the grinder roller by means of the at least one sensor arranged in the grinder roller.

11. The method according to claim 10, wherein the step of detecting the state of the grinder roller is carried out continuously during the operation of the product processing plant.

12. The cap made of ceramic material and configured or adapted for use as a cap for enclosing the at least one sensor in the receiving opening of a grinder roller according to claim 1.

13. A kit consisting of the cap according to claim 12 and a fastening device consisting of a ring made of a metallic material.

14. The grinder roller according to claim 1, wherein the ceramic material is adapted to have relative permittivity in the range of 5 to 50.

15. The grinder roller according to claim 1, wherein the ceramic material is adapted to be permeable to electromagnetic waves in the range of the radio signal transmission at about 2.4 GHz.

* * * * *